No. 699,588. Patented May 6, 1902.
C. W. STEVENS.
PROCESS OF MAKING ARTIFICIAL STONE.
(Application filed Mar. 21, 1901.)
(No Model.) 2 Sheets—Sheet 1.
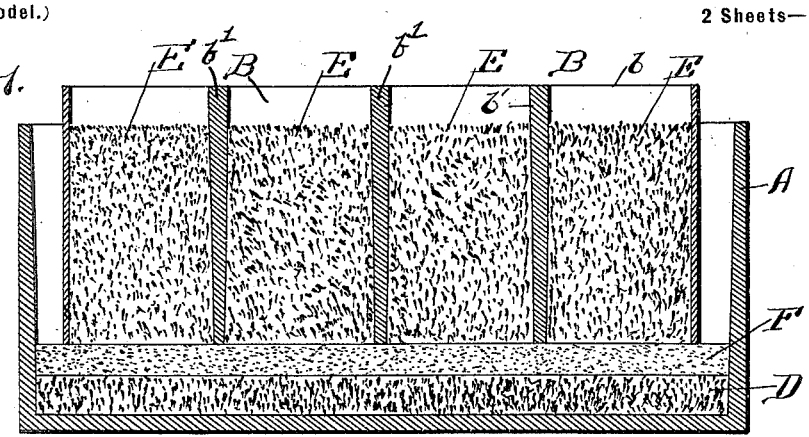
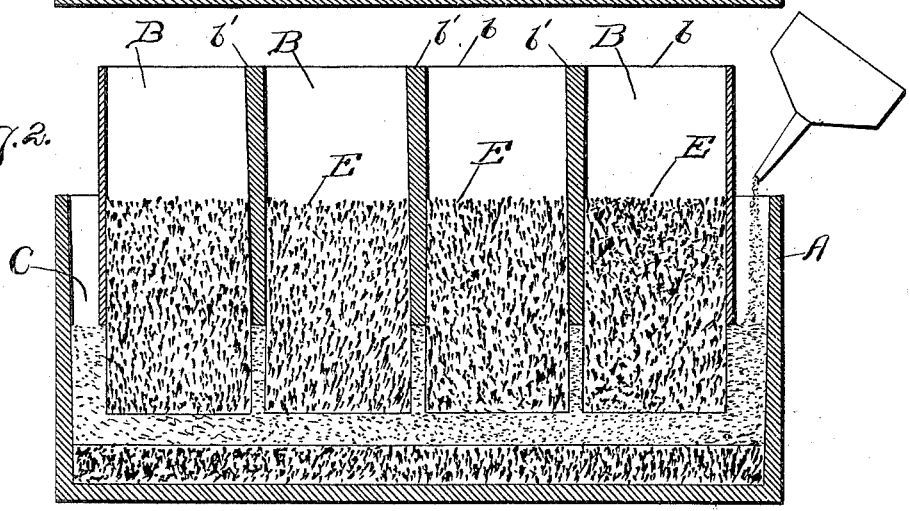
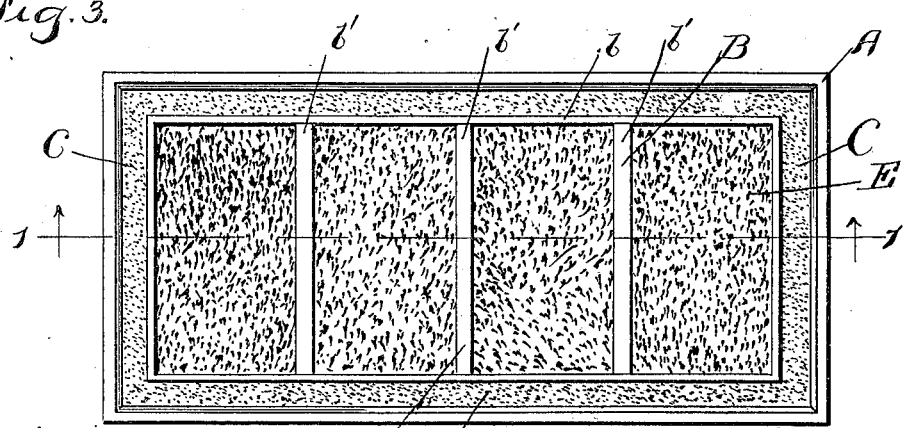
Witnesses: Inventor
J. B. Weir Charles W. Stevens
Robert Weir Jr. By Raymond & Barnett
 Attorneys No. 699,588. Patented May 6, 1902.
C. W. STEVENS.
PROCESS OF MAKING ARTIFICIAL STONE.
(Application filed Mar. 21, 1901.)
(No Model.) 2 Sheets—Sheet 2.
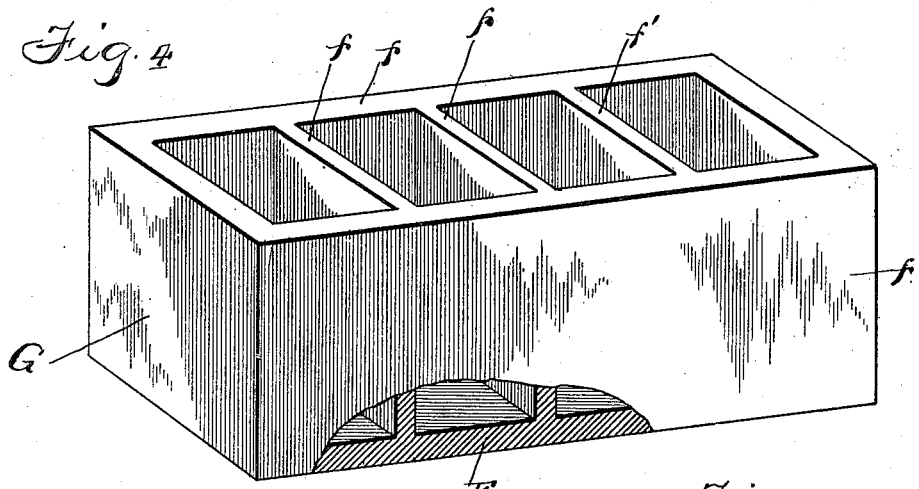
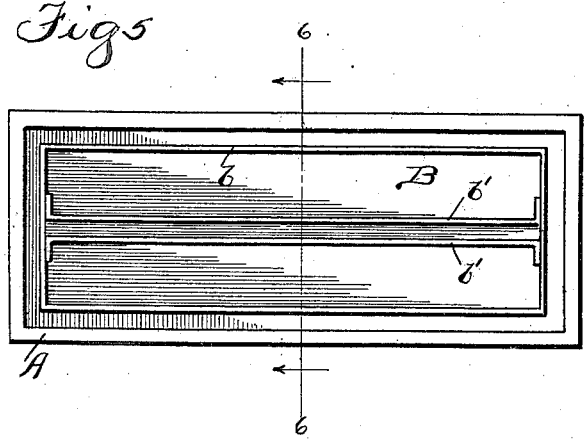
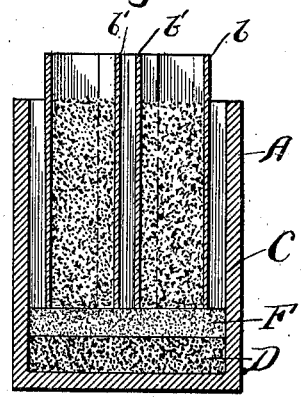
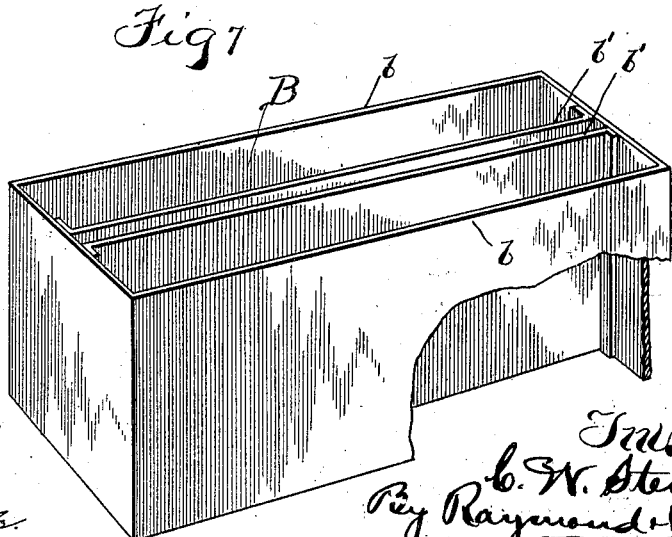
Witnesses:
JB Weir
Robert Weir Jr.
Inventor
C. W. Stevens,
By Raymond & Barnett
Attorneys
THE NORRIS PETERS CO., PHOTO-LITHO., WASHINGTON, D. C.

UNITED STATES PATENT OFFICE.

CHARLES W. STEVENS, OF NORTH HARVEY, ILLINOIS.

PROCESS OF MAKING ARTIFICIAL STONE.

SPECIFICATION forming part of Letters Patent No. 699,588, dated May 6, 1902.

Application filed March 21, 1901. Serial No. 52,185. (No specimens.)

*To all whom it may concern:*

Be it known that I, CHARLES W. STEVENS, a citizen of the United States, residing at North Harvey, in the county of Cook and State of Illinois, have invented certain new and useful Improvements in Processes of Making Artificial Stone, of which the following is a specification.

My invention relates to improvements in the process of making artificial stone in which dry sand, earth, or the like is used in connection with a mold to absorb moisture from the stone compound as the same is filled into the mold.

The object of my invention is to adapt such process to the manufacture of perforated or partially-perforated or hollow forms of artificial stone and to the manufacture of any forms of artificial stone in which webs or partitions of stone surround or partially surround spaces. These and such other objects as may hereinafter appear are attained by the devices illustrated in the accompanying drawings, in which—

Figure 1 shows a longitudinal sectional view of my apparatus in use in the practice of my improved process, said view being taken on the line 1 1 of Fig. 3. Fig. 2 is a similar view showing the process advanced a step beyond the condition shown in Fig. 1. Fig. 3 is a plan view of Fig. 1. Fig. 4 is a perspective view, partly broken away, of a stone or tile made in accordance with my process in the apparatus shown in the preceding three figures. Fig. 5 is a plan view of a modification of my apparatus. Fig. 6 is a cross-sectional view on the line 6 6 of Fig. 5; and Fig. 7 is a perspective view, partly broken away, of the modified form of core-box used in my apparatus, as shown in Figs. 5 and 6.

Similar letters of reference indicate the same parts in the several figures of the drawings.

Referring by letter to the accompanying drawings, A is a molder's flask. B is a bottomless core-box adapted to be set therein and comprising the framework b and partitions b'. Said core-box is adapted to be set in the flask, so as to leave the space C, surrounding the core-box, between it and the sides of the flask.

D is a bed of sand in the bottom of the flask. E E are sand cores which are formed in the core-box B.

F is a layer of artificial-stone compound.

G, Fig. 4, is an artificial stone molded by my process and comprising the face F, the walls *f*, and the webs *f'*.

It will be understood that in the practice of this process relatively dry sand is used to absorb moisture from the fresh stone compound in the manner exemplified in my Patent No. 624,563, dated May 9, 1899. Obviously sand in such condition cannot be packed or made to hold together, so as to form cores around which to mold artificial stone such as that shown in Fig. 4 of the drawings. To overcome this difficulty and provide a process and apparatus by the use of which such artificial stone may be formed with the dry-sand process, and yet in such a manner as to insure true and symmetrical walls and partitions, are among the objects of my invention, and the results desired are attained by my invention in the following manner: A suitable layer of "dry" sand is spread in the bottom of the flask A and is leveled so as to conform with an outer surface of the stone which is to be formed. A layer of liquid or semi-liquid artificial-stone compound F is then poured into the flask and upon the bed of relatively dry sand D, and is thereby subjected to the absorptive action of the sand. This layer F forms one wall of the stone to be formed, such as the bottom wall F of Fig. 4. The bottomless core-box B is then placed in the mold D upon the fresh layer of artificial stone F. The spaces inclosed by the walls *b* and partitions *b'* of the core-box are then filled with dry sand, thereby forming sand cores which rest upon the upper surface of the layer of artificial stone F. Additional liquid artificial-stone compound is then poured into the flask A and around the core-box B, and while it is still in a sufficiently-liquid condition to flow readily the core-box B is lifted, as shown in Fig. 2, more liquid stone compound being added meanwhile. As the core-box is lifted from the surface of the layer of artificial stone F the artificial-stone compound flows into the space between the sand cores E, uniting with the layer F and continuously following the lower ends of the walls *b* and the partitions *b'* as the core-box is withdrawn, thereby simultaneously filling the spaces previously occupied by said walls and partitions and retaining the dry sand E against displacement. The inflowing stone compound and the withdrawing partitions and walls of the core-box B being thus kept in contact or close together until the core-box B is entirely withdrawn and the spaces in the flask are filled with artificial-stone compound to the desired extent supporting-walls for the relatively dry sand are continuously furnished during the entire operation, and the loose masses of sand being so kept from displacement serve perfectly as cores, and the relatively dry sand immediately begins absorption of the surplus moisture in the stone compound. Where, however, it is found necessary or desirable to mold stone in forms having long and narrow or thin webs, a modification of my apparatus—such, for instance, as is shown in Figs. 5, 6, and 7—is desirable, for as the layer of stone compound F must be sufficiently set to support the core-box before placing the same thereon it is evident that as the core-box is withdrawn the inflowing liquid cement must flow in at the ends of the spaces previously occupied by the partitions $b'$, and where these spaces are long and narrow it may happen that the dry sand will fall therein as the partitions $b'$ are withdrawn before the inflowing liquid stone compound shall have traveled the necessary distance to fill such spaces. To overcome this difficulty, I provide the modified form of core-box shown in plan, cross-section, and perspective in Figs. 5, 6, and 7, respectively. This consists of a bottomless framework B, preferably of light sheet metal, divided longitudinally by the hollow or double partition $b'$. This modified form of my apparatus is used substantially in the same manner as the apparatus before described, except that the space or spaces between the cores of soft sand may be filled with artificial-stone compound by pouring the liquid compound directly into the hollow partition $b\ b'$, as well as into the spaces surrounding the framework B. Then as the core-box is gradually withdrawn the liquid stone compound has only to flow in each direction a distance equivalent to the thickness of the sides of the partitions $b'$ in order to completely fill the space between the cores.

To facilitate the effective and rapid use of my apparatus in the practice of my improved process, it will be found desirable to taper the partitions $b'$ from the upper to the lower ends thereof. This, however, is not an essential feature of my invention; nor is it essential to my invention that dry sand be the material used to form the dry and non-cohesive core, for while I have found dry sand to best suit the purpose other substances, such as dry earth and perhaps sawdust and the like, may be substituted therefor without departing from the spirit of my invention. So, also, the walls and partitions of the core-box B may be made so that all or any part of them may be separately removed, instead of being constructed so as to be removable as a whole, in the manner hereinbefore shown and described.

Having thus described my invention, what I claim, and desire to secure by Letters Patent, is—

1. The process of making artificial stone, which comprises pouring a wet artificial-stone compound into a mold and around a bottomless core-box, said box containing a core of dry sand or similar material, and in withdrawing said core-box, while said compound is still in a flowing condition, in such a manner that said flowing compound will follow the lower ends of said core-box and fill in after it as the same is withdrawn, and in then allowing the stone compound to set, substantially as described.

2. The process of making artificial stone, which comprises pouring a wet artificial-stone compound into a mold and around a core-box surrounding a plurality of relatively dry sand cores, and in withdrawing said core-box so that said stone compound will flow into and fill the spaces previously occupied by the walls and partitions of said core-box, and in then allowing the stone compound to set, substantially as described.

3. The process of making artificial stone, which consists in forming a layer of sand in the bottom of a mold, in pouring liquid stone compound upon said layer of sand, in placing a core-box containing a plurality of bottomless core-chambers upon said layer of stone compound, in filling relatively dry sand into said core-chambers, in then pouring plastic stone compound into said mold and around said core-box, and in then withdrawing said core-box so that the stone compound will flow into the spaces surrounding said cores, and in then allowing said stone compound to set, substantially as described.

4. The process of making artificial stone, which consists in forming a dry-sand core in a mold, said core being surrounded and supported by removable walls, in then pouring artificial-stone compound, in a plastic or semi-liquid condition, into said mold and around said core, in then removing the supporting-walls surrounding said core, while said stone compound is still sufficiently plastic to flow into the space previously occupied by said removable walls, and in then allowing said compound to set, substantially as described.

5. The process of making artificial stone, which consists in forming a mold containing a plurality of dry-sand cores, said cores being laterally supported and separated by removable parting-boards, in then pouring wet artificial-stone compound into said mold, in then removing said parting-boards, while said compound remains sufficiently plastic to flow into the spaces between and surrounding said sand cores, and in then allowing the stone compound to set, substantially as described.

6. The process of making artificial stone, which consists in forming a mold containing a plurality of dry-sand cores, said cores being laterally supported by removable parting-boards and separated by parting-boards so disposed as to provide a space between the opposing faces of said parting-boards, in then pouring wet artificial-stone compound into said mold around and between said parting-boards, in withdrawing said parting-boards while the stone compound is still sufficiently plastic to flow into the spaces previously occupied by the parting-boards, and in then allowing the compound to set, substantially as described.

CHARLES W. STEVENS.

Witnesses:
O. R. BARNETT,
M. E. SHIELDS.